United States Patent [19]
Chang

[11] Patent Number: 5,633,481
[45] Date of Patent: May 27, 1997

[54] EXHAUST PIPE CONSTRUCTION

[76] Inventor: Te-Kuei Chang, No. 2, Ave. 16, Lane 114, Yu Ren Road, Fung Yung, Taichung, Taiwan

[21] Appl. No.: 546,576

[22] Filed: Oct. 20, 1995

[51] Int. Cl.⁶ ........................ F01N 1/14
[52] U.S. Cl. .............. 181/260; 55/276; 55/DIG. 30; 60/310
[58] Field of Search .................. 181/227, 228, 181/258, 259, 260, 261; 55/232, 334, DIG. 30, 276; 60/310

[56] References Cited

U.S. PATENT DOCUMENTS

| | | | |
|---|---|---|---|
| 1,838,645 | 12/1931 | Voigt | 181/261 |
| 3,957,467 | 5/1976 | Kim | 55/DIG. 30 X |
| 4,301,652 | 11/1981 | Sohda et al. | 181/261 X |
| 5,175,998 | 1/1993 | Simuni | 60/310 |
| 5,180,406 | 1/1993 | Shih | 55/232 |

*Primary Examiner*—Khanh Dang

[57] ABSTRACT

An exhaust pipe construction for a motor vehicle includes a connecting device, a discharge device, and a filter disposed between the connecting device and the discharge device. The connecting device is a tee tube having a first port connected to an exhaust port of the engine compartment the motor vehicle, a second port connected to an intake port of the filter tank and a third port opened to the outside environment. The filter tank has a space for accommodating at least one filter unit. The filter tank has the intake port at a front end thereof and a discharge port at a rear end thereof, the discharge port being connected to the discharge device. The space inside the filter tank accommodates treated alkaline water of a predetermined amount. The filter unit has two guide tubes and three fork tubes, all of which have inlets at a baffling frame behind the intake port. The guide tubes have their outlets immersed in the alkaline water, while the fork tubes have their outlets connected to the discharge port of the filter tank. The fork tubes further have straight portions provided with guide plates and bent portions immersed in the alkaline water. The discharge device contains activated carbon and is provided with guide plates.

6 Claims, 6 Drawing Sheets

EXHAUST PIPE CONSTRUCTION

BACKGROUND OF THE INVENTION

1. Field of the Invention

The present invention relates generally to an exhaust pipe, and more particularly to an exhaust pipe with filtration and muffling effects.

2. Description of the Prior Art

Exhaust emitted by motor vehicles are harmful to our environment. It is well known in the art that wadding or cotton-wool is used in conventional exhaust pipes to filter diet particles in the exhaust and absorb some of its noise. But wadding or cotton-wool cannot effectively remove toxic substances in the exhaust or muffle the noise generated thereby.

SUMMARY OF THE INVENTION

A primary object of the present invention is to provide an exhaust pipe construction, which may effectively remove toxic substances in the exhaust and muffle its noise.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
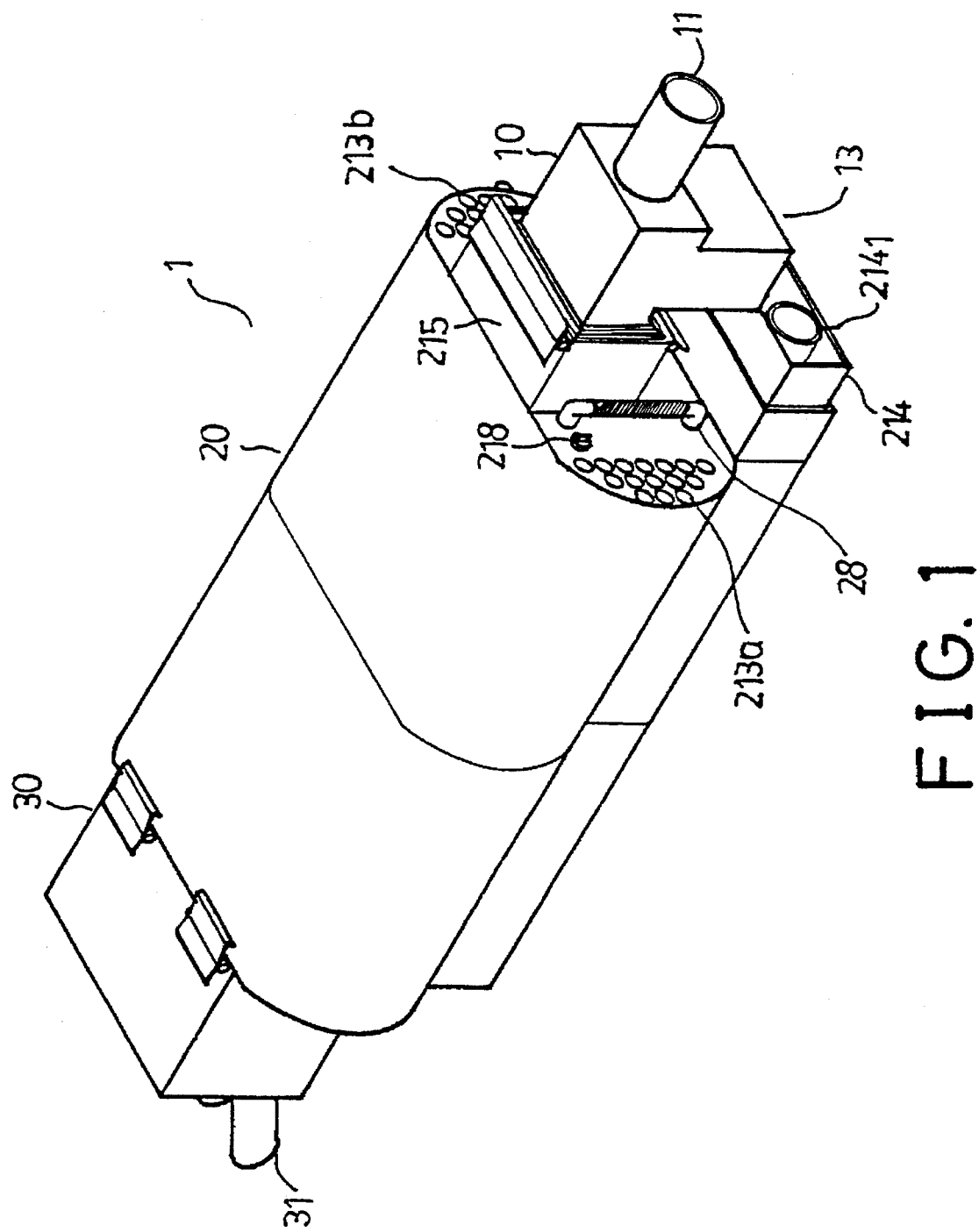
FIG. 1 is a schematic view of the exhaust pipe of the present invention.
Figure 2:
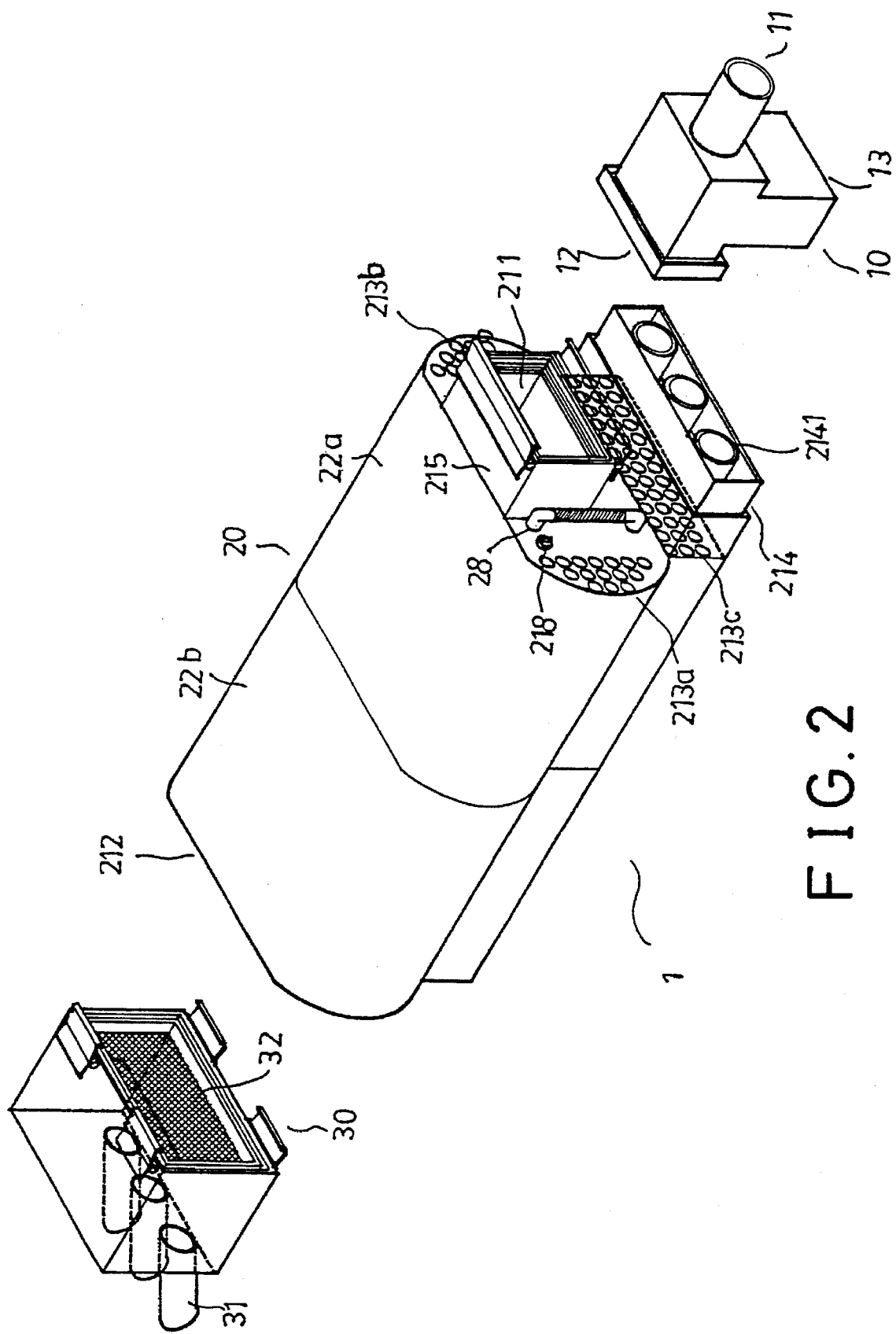
FIG. 2 is a perspective exploded view of the exhaust pipe of the present invention.

With reference to FIGS. 1 and 2, the exhaust pipe 10 of this invention essentially comprises a connecting device 10 provided at a front end thereof, a filter tank 20 at a middle portion thereof, and a discharge device 30 at a rear end thereof. The connecting device 10 is substantially a tee tube having a round tube portion with a first port 11 at one lateral side thereof and a second port 12 at the other lateral side thereof. The first port 11 is directly connected to an exhaust port (not shown) of the engine compartment of a motor vehicle, while the second port 12 is connected to a front end of the filter tank 20. The connecting device 10 further has a third port 13 at the bottom of its longitudinal portion for opening to the outside. An upright gate 121 is provided at a front end of the second port 12 to serve as a unidirectional control valve for ensuring that flow of exhaust into the filter tank 20 is unidirectional and that reverse flow of exhaust in the filter tank 20 is prevented. The third port 13 is internally provided with a horizontal gate 131, which also serves as a unidirectional control valve to permit flow of ambient air into the connecting device 10 in a single direction only, so as to maintain balance of pressure in the exhaust pipe and the outside environment to prevent occurrence of vacuum therein during occasional reverse intake in the process of exhaust stroke. Such an arrangement not only provides protection for the exhaust pipe of the invention and the engine but also ensures that the exhaust from the engine passes through the exhaust pipe prior to emission.

The filter tank 20 is an enclosed tank with a suitably sized space 21. The filter tank 20 has an intake port 211 at an upper portion of its front end and a discharge port 212 at a rear end thereof. The space 21 contains a predetermined amount of treated alkaline water 40 and houses at least one filter unit 22. In this preferred embodiment, there are provided a first filter unit 22a and a second filter unit 22b, which will be discussed hereinbelow.

The space 21 has a water intake port 218 provided in an upper portion of an outer wall of the filter tank 20 and a water discharge port 219 at a bottom side thereof for entrance and discharge of alkaline water 40. The two filter units 22a and 22b are connected by means of a connecting duct 29 for balancing the level of alkaline water 30 inside the filter units 22a and 22b. A water gage 28 is disposed on one side of the filter tank 20 so that the level of alkaline water 40 inside the space 21 may be checked directly. Furthermore, a multiplicity of laterally oriented air vents 213 are provided to run lengthwise through the filter tank 20. In this preferred embodiment, air vents 213a and 213b are respectively provided on the left and right sides of the intake port 211 and are open on the outside so that the ambient air may go in and cool the alkaline water 40 in the space 21. Air vents 213c are provided at a lower portion of the filter tank 20 below the intake port 211, ant a connecting portion 214 is provided in front of the air vents 213 and is open to the outside. The connecting portion 214 consists of a plurality of round tubes 2141 for connection to a fan (not shown). When the temperature of the alkaline water 40 in the space 21 reaches a predetermined value, the fan will be automatically actuated and starts drawing in air to cool the alkaline water 40. Besides, the intake port 211 at the front end of the filter tank 20 is configured to protrude from the outer wall of the filter tank 20 to form a receiving portion 215, which has a groove 216 for engaging the connecting device 10. The groove 216 is provided with a gasket 217, such that when the connecting device 10 is fitted with its first port 12 into the receiving portion 215, it may be retained by the groove 217. Obviously, other fastening means may be adopted to secure their connection.

Figure 3:
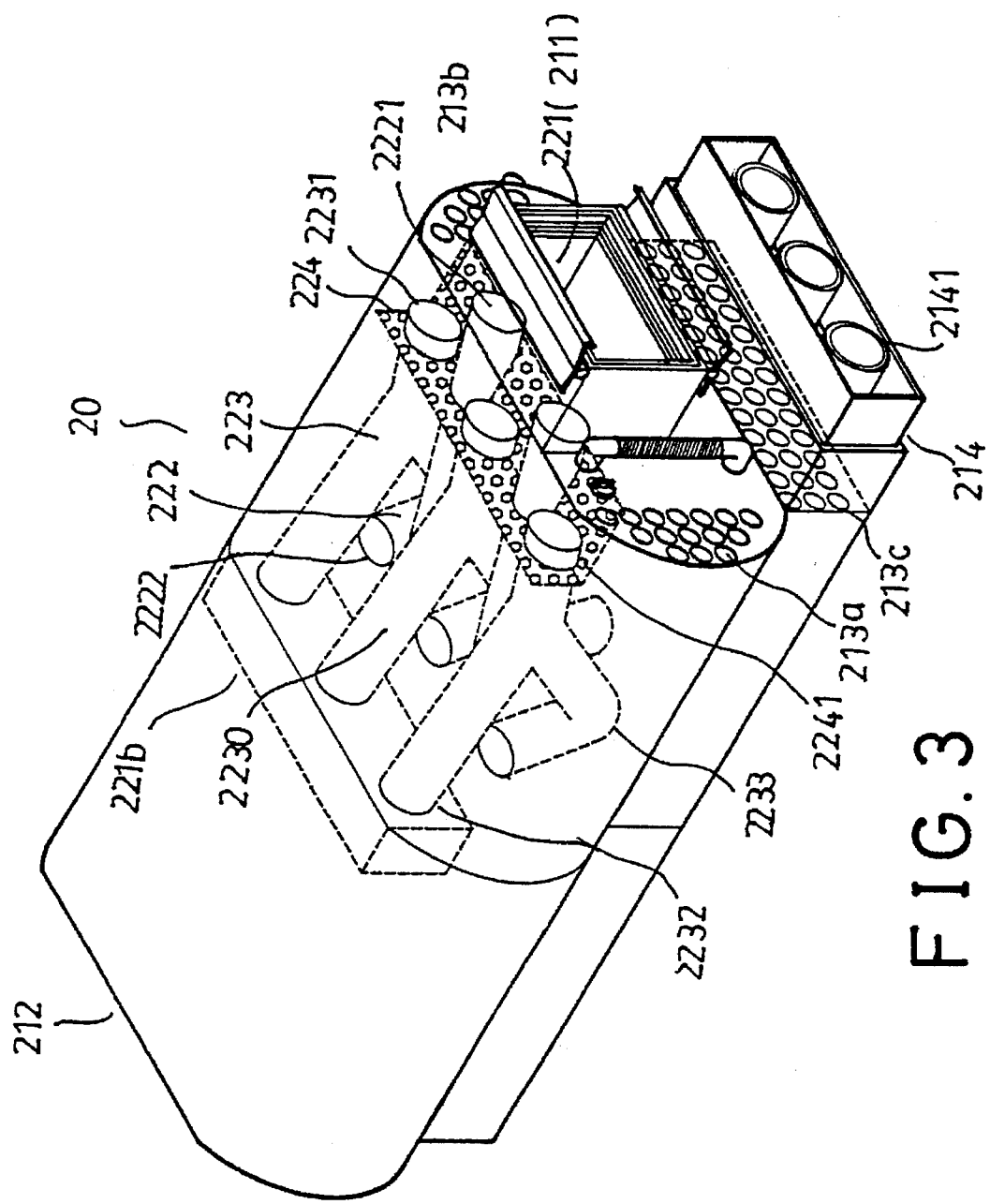
FIG. 3 is a perspective view of the exhaust pipe of the present invention in part.

With reference to FIG. 3, the filter unit 22 has a collect chamber 221 at a front portion thereof, two guide tubes 222 and three fork tubes 223. The fork tubes 223 and two guide tubes 222 are arranged in an alternate manner and have their respective inlets 2221, 2231 disposed and positioned at a baffle frame 224, which is mounted behind the collect chamber 221. The baffle frame 224 is substantially L-shaped and has a multiplicity of tiny holes 2241. The guide tubes 222 are substantially V-shaped and bent downwardly. Each guide tube 222 has its inlet 2221 located at the baffle frame 224 while its outlet 2222 is oriented downwardly and immersed in the alkaline water 40. Each fork tube 223 is substantially Y-shaped and has a substantially straight portion 2230 horizontally disposed such that its inlet 2231 is located at the baffle frame 224 and its outlet 2232 extends towards the rear side of the filter unit 22, with its bent portion 2233 immersed in the alkaline water 40. The bent portions 2233 further have a plurality of round holes 2234 near their end portions so that the bent portions may be filled with alkaline water 40. In addition, the straight portion 2230 of the fork tube 223 is internally provided with a plurality of guide plates 2235, which are arranged on an upper wall and a lower wall of the straight portion 2230 in an alternate manner (see FIG. 5). Each of the guide plates 2235 at the lower wall of the straight portion 2230 is further provided with tiny holes 2236 for passage of water droplets collected on the guide plate 2235. Since the filter tank 20 in this preferred embodiment is comprised of two filter units 22a and 22b, during assembly, a first collect chamber at a front end of the first filter unit 22a is directly formed in the intake port 211 of the filter tank 20, with outlets 2232 of first fork tubes 223a connecting directly with a second collect chamber 221b at a front end of the second filter unit 22b, second fork tubes 223b of which being connected to the discharge port 212.

The discharge device 30 has a front end thereof connected to the discharge port 212 of the filter tank 20, and a rear end thereof provided with a plurality of round exhaust tubes 31 for discharging exhaust. The discharge device 30 is internally provided with a plurality of muffling screens 32 of activated carbon, and each of the exhaust tubes 31 is provided with a plurality of guide plates 33 disposed at an upper wall and a lower wall in an alternate manner for extending the exhaust discharge path.

Figure 4:
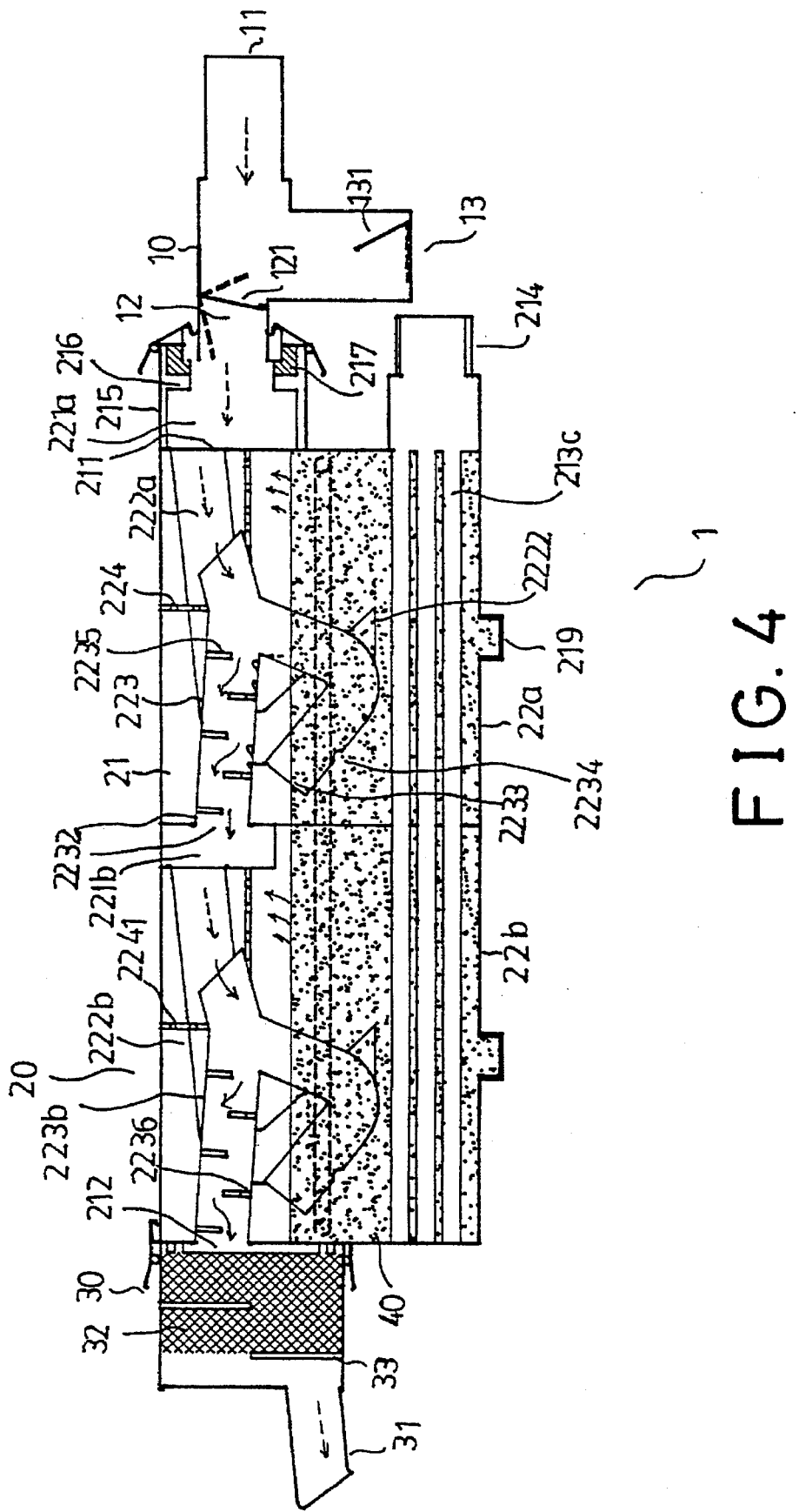
FIG. 4 is a sectional schematic view of the exhaust pipe of the present invention in an assembled state.

Assembly of the exhaust pipe 1 of the invention comprising the above-described components will be discussed below. The connecting device 10 is first coupled to the front end of the filter tank 20 and the discharge device 30 is then connected to the rear end of the filter tank 20. The connecting device 10 is connected to the exhaust port of the engine of the motor vehicle so that the exhaust discharged may enter into the filter tank 20. With reference to FIG. 4, which shows the operation of the exhaust pipe of the invention when a motor vehicle is moving along a flat and level road surface. The exhaust will first enter the first guide tubes 222a of the first filter unit 22a via inlets 2221 and flow into the alkaline water 40. The alkaline 40 will absorb the noise of exhaust and dissolve considerable amount of soluble oil droplets, carbon dioxide particles or cinder, hence removing certain amount of toxic substances from the exhaust. The exhaust with the undissolved substances then escapes from the alkaline water 40 into inlets 2231 of the first fork tubes 223a past the guide plates 2243 along the straight portions 2230a its path. Aside from extending the travel of the exhaust and reducing the noise thereof, the guide plates 2243 are also provided to retain some of the oil droplets and moisture carried in the exhaust, which are collected on the guide plates 2243 and drop through the tiny holes 2244 at the lower portion of the guide plates 2243 into the bent portions 2233. The exhaust leaving the first filter unit 22a will have its noise and toxic contents reduced by more than half. The exhaust discharged via the outlets 2232 of the first fork tubes 223a of the first filter unit 22a then enters the second collect chamber 221b of the second filter unit 22b into the second guide tubes 222b, and the above-described filtration cycle is repeated therein. The exhaust coming out of the filter tank 20 subsequently enters the discharge device 30 and flows past the guide plates 33 therein and through the screens of activated carbon which absorbs tiny residual particles of carbon dioxide in the exhaust before the exhaust is discharged via the round exhaust tubes 31 to the outside environment. The emitted exhaust will be comparatively free of toxic substances and make little noise. The exhaust pipe construction of the invention is indeed an environmental friendly one, which may reduce air and noise pollution.

Figure 5:
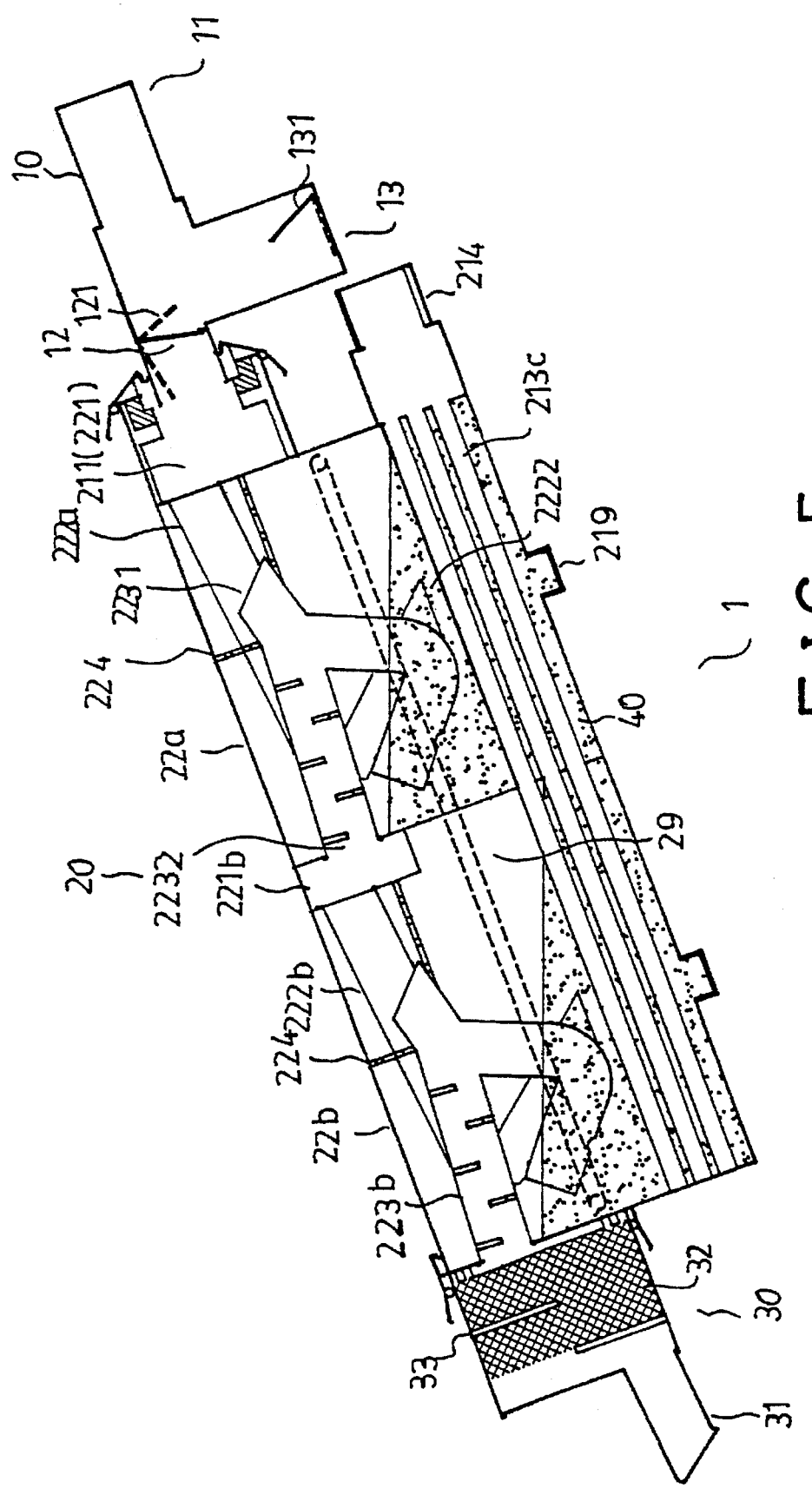
FIG. 5 shows the operation of the exhaust pipe of the invention when a motor vehicle is moving up a slope.
Figure 6:
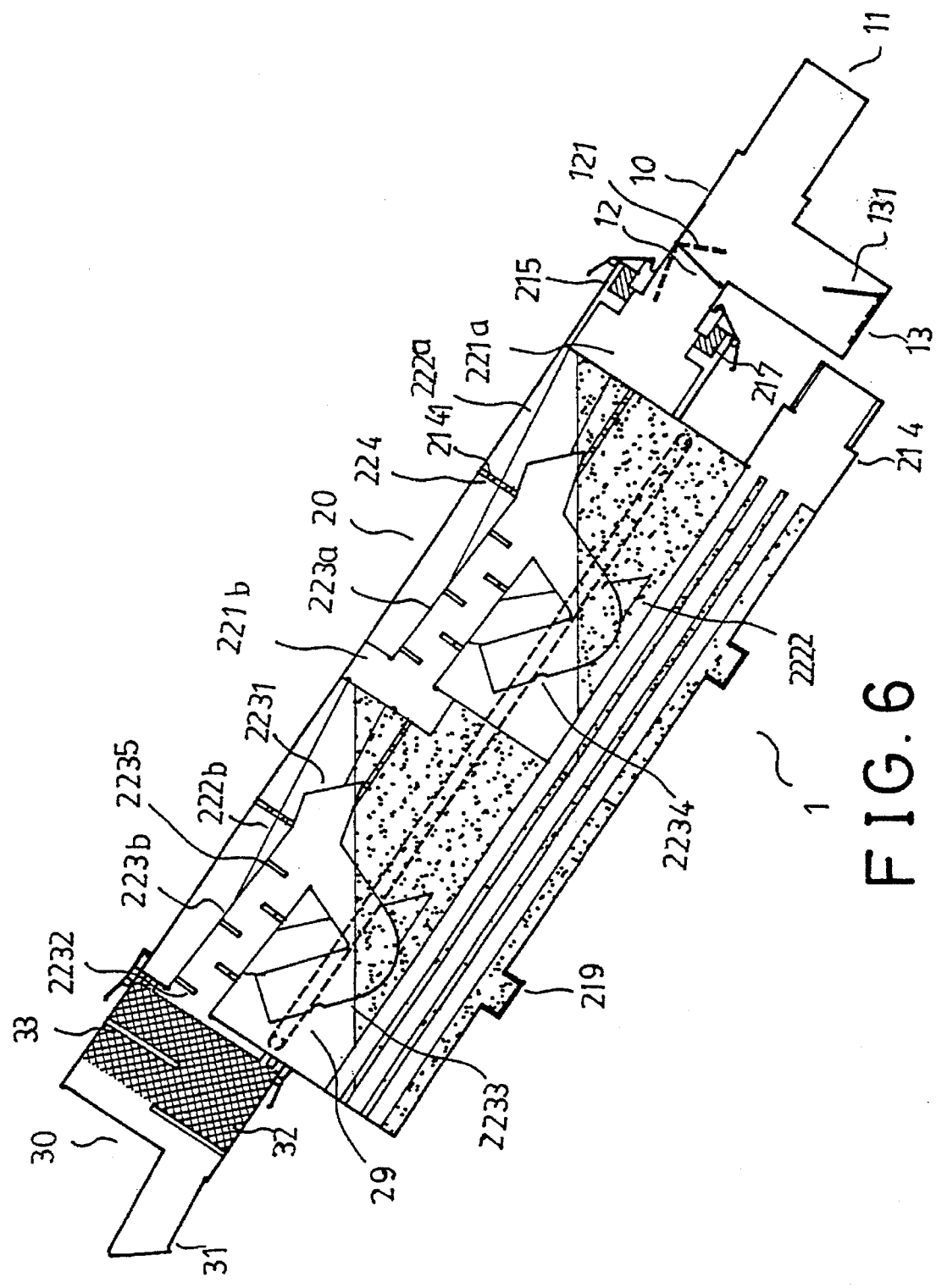
FIG. 6 shows the operation of the exhaust pipe of the invention when the motor vehicle is moving down a slope.

Reference is now made to FIGS. 5 and 6 which show the operation of the exhaust pipe of the invention when a motor vehicle is moving up a slope. Under such a circumstance, even though the alkaline water 40 inside the slanting first and second filter units 22a and 22b flows backwardly, the outlets 2222 of the first guide tubes 222a of the first filter unit 22a are still immersed in the alkaline water 40. Exhaust escaping from the first guide tubes 222a rises upwardly through the tiny holes 2241 in the baffle frame 224 into the straight portions 2230 of the first fork tubes 223a and out through outlets 2232 into the second collect chamber 221b of the second filter unit 22b, where the exhaust is again filtered and muffled. It can therefore be seen that the flow of exhaust will not be affected even on a sloping surface. Additionally, since the exhaust path lies in the guide tubes 222 and straight portions 2230 of the fork tubes 223, although the bent portions 2234 of the fork tubes 223 have a larger part thereof immersed in the alkaline water 40 when the motor vehicle moves up the slope, the normal exhaust filtration process will not be affected. And since the first filter unit 22a and the second filter unit 22b are connected by the connecting duct 29 only, the alkaline water 40 inside the first filter unit 22a will not flow backwardly into the second filter unit 22b, nor the straight portions 2230 of the first fork tubes 223a into the second guide tubes 223b of the second filter unit 22b. Likewise, the alkaline water 40 in the second filter unit 22b will not enter the straight portion 2230 of the second fork tubes 223b and into the discharge device 30. And when the motor vehicle is moving down the slope, the alkaline water 40 inside the filter unit 22 flows forwardly, with the outlets 2222 of the guide tubes 222 and the bent portions 2234 of the fork tubes 223 immersed in the alkaline water 40. Exhaust not dissolved in the alkaline water 40 may escape therefrom and rises through the tiny holes 2241 of the baffling frame 224 and exits through the straight portions 2230 of the first fork tubes 223a into the second filter units 22b where the exhaust is subjected to the same filtration and muffling process. Therefore, it can be seen that although the alkaline water 40 inside the first filter unit 22a slants forwardly, it will not flow into the straight portions 2230 of the first fork tubes 223a, obstructing the path of the exhaust. Nor will the alkaline water 40 inside the second filter unit 22b flow into the straight portions 2230 of the second fork tubes 22 or the second guide tubes 222b, obstructing the exhaust from flowing into the discharge device 30 for the subsequent filtration process. The filtration process of the exhaust inside the exhaust pipe of the invention may be kept smooth whether the motor vehicle is on level road surfaces or moving up or down slopes. The drawbacks in the prior art are eliminated in the exhaust pipe of the invention.

Although the present invention has been illustrated and described with reference to the preferred embodiment thereof, it should be understood that it is in no way limited to the details of such embodiment but is capable of numerous modifications within the scope of the appended claims.

What is claimed is:

1. An exhaust pipe for a motor vehicle, said exhaust pipe comprising:

a connecting device disposed at a front end of said exhaust pipe, said connecting device is substantially a tee tube having a first port connected directly to an exhaust port of an engine compartment of the motor vehicle, a second port connected to an intake port of a filter tank, and a third port opening to the outside environment, said second port having an upright gate disposed therein for allowing unidirectional flow of exhaust into said filter tank, and said third port having a horizontal gate for permitting unidirectional flow of ambient air into said connecting device;

said filter tank disposed between said connecting device and a discharge device, said filter tank having a suitably sized space and being an enclosed structure, said filter tank further having said intake port at an upper portion of a front end thereof and a discharge port at a rear end thereof, said intake port connecting said connecting device while said discharge port connecting said discharge device, said space accommodating at least a filter unit and treated alkaline water of a predetermined amount, said front end of said discharge device being provided with a multiplicity of laterally oriented air vents running lengthwise of said filter tank for passage of ambient air into said filter tank device to cool the alkaline water, said filter unit having a collect chamber disposed at a front end thereof and two guide tubes and three fork tubes which are arranged in an alternate manner, said guide tubes and said fork tubes having inlets all disposed and positioned at a baffling frame which is mounted behind said collect chamber, said baffling frame being an L-shaped structure with a multiplicity of tiny holes, said guide tubes being substantially V-shaped and bent downwardly with outlets immersed in the alkaline water, said fork tubes being substantially Y-shaped and having horizontally disposed straight portions with outlets connected to said discharge port at the rear end of said filter tank, said fork tubes further having bent portions immersed in the alkaline water, said bent portions having a plurality of round holes at a lower part thereof such that said bent portions are filled with alkaline water, and said straight portions of said fork tubes further having a plurality of guide plates disposed at an upper wall and a lower wall thereof in an alternate manner; and said discharge device disposed at a rear end of said exhaust pipe, said discharge device having a front end thereof connected to said filter tank and a plurality of round exhaust tubes at a lower portion of a rear end thereof for discharging exhaust, said discharge device having multiple screens of activated carbon disposed therein and a plurality of guide plates alternately arranged in an upper wall and a lower wall thereof, wherein exhaust emitted from the engine compartment of the motor vehicle enters via said filter tank into said guide tubes of said filter unit of said filter tank and into the alkaline water where the exhaust is subjected to a first filtration and muffling; the exhaust then escapes into said fork tubes where said guide plates disposed along said straight portions may prolong travel of the exhaust and its sound wave and remove some of the toxic substances carried in the exhaust, and the exhaust subsequently enters said discharge device to be further filtered by the activated carbon and discharged to the outside environment via said exhaust tubes.

2. An exhaust pipe construction as claimed in claim 1, wherein said filter tank has a water intake port at an upper side thereof for filling of alkaline water into said space inside said filter tank, and a water discharge port for emission of alkaline water.

3. An exhaust pipe construction as claimed in claim 1, wherein said air vents are provided on both sides of said intake port at the front end of said filter tank for permitting entrance of ambient air into said filter tank, and said air vents are also provided at a bottom portion of said filter tank below said intake port and are connected to a connecting portion located in front, said connecting portion being connected to a fan, which will be automatically actuated when the temperature of the alkaline water reaches a predetermined value.

4. An exhaust pipe construction as claimed in claim 1, wherein said collect chamber of said filter tank is disposed in said intake port and forms a receiving means with a groove provided with a gasket for receiving an end portion of said second port of said connecting device.

5. An exhaust pipe construction as claimed in claim 1, wherein a water gage is provide on an outer side of said filter tank so that the level of the alkaline water inside said filter tank may be checked.

6. An exhaust pipe construction as claimed in claim 1, wherein said filter tank consists of more than one filter unit, a second collect chamber at a front end of a second filter unit is connected to outlets of first fork tubes of a first filter unit, and outlets of second fork tubes of said second filter unit are connected to said discharge port of said filter tank, said filter tank may be externally connected to water pipes for balancing the level of alkaline water therein.

\* \* \* \* \*